S. PERKINS.
Wagon-Wheel.
No 13,012.
Patented June 5, 1855.
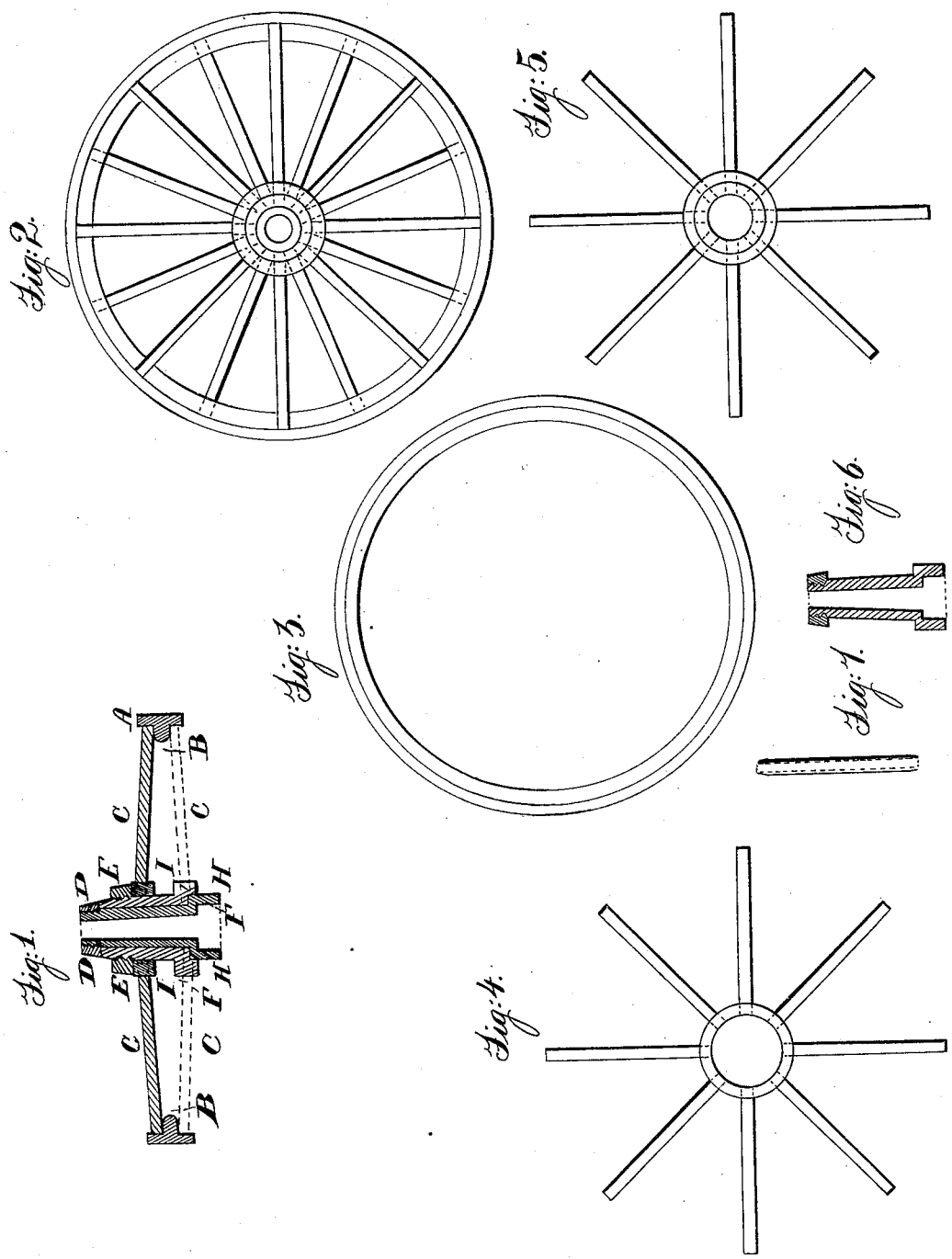

UNITED STATES PATENT OFFICE.

SYLVANUS PERKINS, OF PITTSBURGH, PENNSYLVANIA.

WAGON-WHEEL.

Specification of Letters Patent No. 13,012, dated June 5, 1855.

*To all whom it may concern:*

Be it known that I, SYLVANUS PERKINS, of Pittsburgh, in the county of Allegheny and State of Pennsylvania, have invented a new and Improved Wagon-Wheel; and I do hereby declare that the following is a full and exact description thereof, reference being had to the accompanying drawings and to the letters of reference marked thereon.

The nature of my invention consists in making wagon wheels by combining and arranging a male and female hub each armed with spokes, the female hub being movable, the spokes in the female hub to arch or dish toward the point of the male hub, and the spokes of the male hub to arch or dish toward its larger end; and also arranging the rim or tire of wheel with a rib on the inside which serves as a stay and abutment for the arches formed by the two sets of spokes. I also arrange a nut on the point of the male hub to be used in bracing or to flatten the arches formed by the spokes. I also arrange a nut on the point of the pipe box which is to be used in fastening and tightening the box in the male hub, and also use hollow spokes.

To enable others skilled in the art to make and use my combination and arrangement, I will proceed to describe its construction and operation.

In the accompanying drawings, Figure 1 is a central section of the hubs, box, nuts, spokes and rim; A, is the rim; B, is the rib on the inside of the rim; H, is the box; D, is the nut on the point of the box used in tightening the box in the hub; F, is the male hub; E, is the nut on the point of the male hub used in moving the female hub and for the purpose of bracing the wheel, I is the female hub.

Fig. 2, is a ground view of the wheel.

Fig. 3, is a ground view of the rim and rib.

Fig. 4, is a ground view of the female hub and spokes.

Fig. 5, is a ground view of the male hub and spokes.

Fig. 6, is a central section of the box, (known as pipe box for wagons or carriages).

Fig. 7, is a central section (lengthwise) of the hollow spoke.

The advantages of my combination and arrangement are as follows, viz., strength, durability, lightness, and overcoming what has hitherto been considered as an insurmountable difficulty, viz., avoiding the contraction of wood, and the expansion of iron in dry and warm weather, and the expansion of wood and the contraction of iron in wet and cold weather. I gain strength by the combined arch of the spokes and rim, durability by constructing the entire wheel of iron, lightness by the use of the rib on the inside of the rim or tire and the hollow spokes, and I overcome the expansion and contraction by making the entire wheel of one material, (such as iron, brass, wood, &c.), and by the movable hub and the use of the nut on the point of the male hub. I also gain another and a very important point by my combination and arrangement, viz., the ease with which the box can be fastened and tightened into, or removed from the male hub.

I do not claim the male and female hubs, or the rib on the inside of the tire, neither do I claim the hollow spoke or the nut on the end of the male hub, as being new in themselves; but What I do claim as of my invention and desire to secure by Letters Patent, is—

The combination and arrangement of the male and female hubs F and I, the spokes C, the rib B, the tire A, the box H, and the nuts E and D, operated as and for the purposes herein set forth.

SYLVANUS PERKINS.

Attest:
 NEWELL CLEVELAND,
 JAMES J. JOHNSTON.